April 28, 1925.  1,535,642
J. G. ARMKNECHT
FUEL RESERVE TANK
Filed Jan. 30, 1922
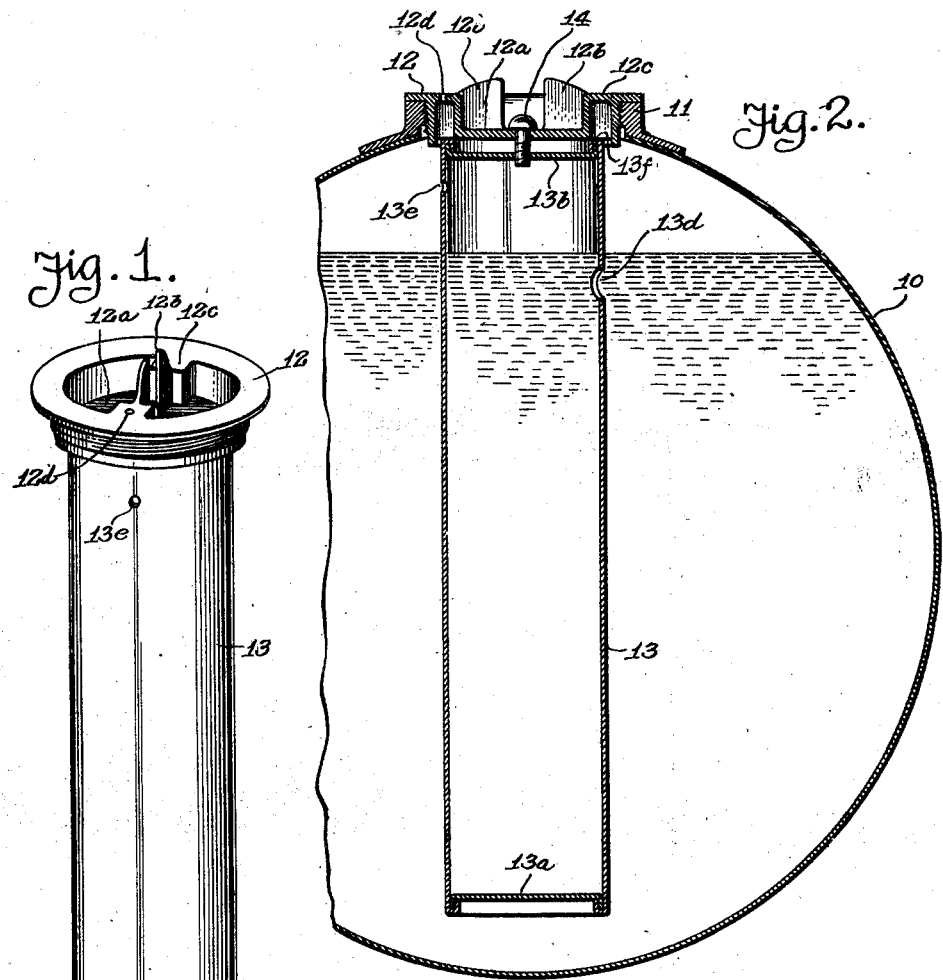
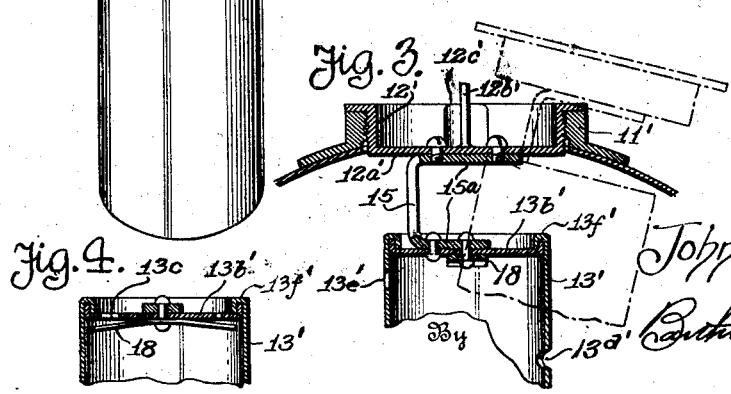
Inventor
John G. Armknecht,
By
Attorneys Patented Apr. 28, 1925.

1,535,642

UNITED STATES PATENT OFFICE.

JOHN G. ARMKNECHT, OF DETROIT, MICHIGAN.

FUEL-RESERVE TANK.

Application filed January 30, 1922. Serial No. 532,613.

*To all whom it may concern:*

Be it known that I, JOHN G. ARMKNECHT, a citizen of the United States of America, residing at Detroit, in the county of Wayne and State of Michigan, have invented certain new and useful Improvements in Fuel-Reserve Tanks, of which the following is a specification, reference being had therein to the accompanying drawings.

This invention relates to fuel reserve tanks, pertaining particularly to structures adapted to contain a supply of fuel normally segregated from the normal supply for the explosive engine, and capable of being used as a supply at the will of the operator.

The invention pertains to that general type which is designed to meet emergency conditions in the operation of motor vehicles, viz: conditions where the supply of fuel becomes exhausted and it becomes necessary to replenish the supply; this condition generally arises at points removed from a service station, the result being that it is necessary to travel to the station in order to obtain a supply and then return to the "dead" motor vehicle in order that the supply may be replenished. To meet this condition it has become the practice to carry a relatively small quantity of fuel normally inaccessible for use as the usual source of supply.

A number of ways of meeting this condition have been employed, some of which involve the use of special structures within the supply tank with the openings at different levels, the usual supply being made accessible through the opening of higher level, the fuel remaining between this level and a lower level constituting a reserve; in such structures it becomes necessary not only to employ a special formation within the tank or an auxiliary to the tank, but also to manipulate valve structures as well as to require the attention of the operator to see that the valve maintains the reserve free from loss, as by accidental opening of the valve through use of the vehicle. Another way of meeting the condition is to employ an auxiliary tank which may or may not be located within the main tank, this auxiliary tank, when located within the main supply tank being generally located in a position relative to the filling opening of the main supply tank and forming the channel through which the fuel reaches the main tank.

The present invention is of that type which employs the auxiliary tank and has for its object the provision of a receptacle which, while extending into the supply tank when in position, is removable from the tank or shiftable relative to the filling opening during the time the tank is being filled, thus permitting the filling operation to place the fuel directly within the main supply tank. This result may be obtained in various ways, but is preferably obtained by mounting the receptacle on the filling cap, so that the latter may be readily moved into and out of its closure position while maintaining the integrity of the reserve, the auxiliary or reserve tank moving with the cap and being capable of removal from the tank bodily with the cap or shiftable with the cap relative to the filling opening in such manner that the supply tank can be readily filled.

Another object is to provide for automatic filling of the reserve tank when in position, if such filling is required, the arrangement being such as to permit of ready controllable discharge of the fuel from the reserve tank into the supply tank by removal of the reserve tank from the supply tank.

And further objects are to provide a construction which is simple and efficient in operation, durable in construction, readily installed without change in the usual tank structures and which can be manufactured at a comparatively low cost.

To these and other ends, therefore, the nature of which will be readily understood as the invention is hereinafter disclosed, said invention consists in the improved construction and combination of parts hereinafter more fully described, illustrated in the accompanying drawings, and more particularly pointed out in the appended claims.

In the drawings, in which similar reference characters indicate similar parts in each of the views, Figure 1 is a perspective view showing one embodiment of the present invention;

Fig. 2 is a longitudinal sectional view of the structure of Fig. 1 with the reserve tank shown in its normal or carrying position within the supply tank;

Fig. 3 is a detail sectional view showing a modified formation;

Fig. 4 is a detail sectional view taken at right angles to the section of Fig. 3.

For the purpose of illustrating the invention I have shown it as applied to a tank 10 having a screwthreaded filling opening 11, this form of tank being simply illustrative of any one of a large number of tanks in commercial use, the filling opening being usually closed by a filler cap having threads adapted to co-operate with the threaded filling opening.

In the present invention the usual filler cap is substituted by a cap 12 having the external threaded zone to permit of engagement with the threads of the filling opening, and a reserve tank 13 secured to the cap so as to depend from the cap within the tank in alinement with the filling opening so that, when the cap is bodily removed, the reserve tank 13 will be removed with it. In the drawings I have shown several ways in which the invention may be carried into effect; in each, however, the tank 13 is provided with a permanently closed bottom $13^a$ as well as a top $13^b$ that is permanently fixed to the tank or container longitudinal walls, and which is of a generally closed characteristic, in that there may be provision therein only for a filling port for the container. In Fig. 2 the top $13^b$ is completely closed; in Figs. 3 and 4 the top is shown as provided with one or more openings $13^c$ which may serve as vent or as filling ports or openings, and beneath which may be located a baffle 18 designed to tend to break down any tendency to throw out fuel from the reserve tank by splashing conditions, and at the same time permit of ready drain of any fuel content that may have splashed on to the upper or outer face of the top, whether from within or without the fuel reserve tank.

The reserve tank may be filled wholly by the splashing activity within the main tank or the splashing action may be used to maintain a filled condition. For instance, the tank 13 may be provided in its longitudinal wall or walls with a comparatively large opening $13^d$ at a desired point relative to the top $13^b$, and also with an additional small opening $13^e$ intermediate opening $13^d$ and the top $13^b$, and preferably located on the opposite side from opening $13^d$. This form is especially adapted for use where the arrangement is as shown in Fig. 2, in which opening $13^d$ is designed for use as both the filling and the discharge opening for tank 13, opening $13^e$ serving as a venting and controlling opening. As presently described, the tank or container 13 is secured to cap 12 and depends therefrom, thus placing opening $13^d$ at a point where it will be located beneath or above or in proximity to a maximum fuel level of the fuel within the main tank 10 when the latter has been approximately filled. The opening $13^d$ may be positioned at such point as not to require complete filling of the main tank and yet produce for a reasonable amount of reserve fuel.

However, it may be desirable, and I generally prefer to locate opening $13^d$ above the normal fuel level, so that filling of the reserve tank may be provided through the splashing activities of the fuel in the main tank, as by locating opening $13^d$ above the usual fuel level of the tank, such arrangement tending to prevent the content of the reserve tank from being splashed out. And this arrangement may place the filling opening in the longitudinal wall of tank 13 in the form of opening $13^d$ or in the upper end wall, opening $13^c$ performing the function in the latter case, the longitudinal walls being imperforate.

This latter arrangement is advantageous for the reason that the annular flange $13^f$ of the container may serve to set up characteristics of a splash-collecting formation of tray-like form.

Opening $13^d$ is shown as located below the fuel level, the result being that the fuel within and without the container 13, will be above opening $13^d$. As the fuel is drawn from the main tank, the fuel level will move downward in both tanks until the level in tank 10 will pass below the opening $13^d$, whereupon further discharge of fuel from the container 13 ceases excepting such as may be provided by splashing. Similarly, splashing in the main tank may deliver additional fuel to this reserve tank or container, the feature being that there is a possibility of open communication between the two tanks at all times through opening $13^d$. If opening $13^d$ be positioned above the usual fuel level, it will be filled by splashing.

Opening $13^e$ (employed when opening $13^d$ is used) provides open communication between the tanks above the level of opening $13^d$ thus enabling the reserve tank to be readily filled through opening $13^d$. Opening $13^e$ has the additional function of being usable as a controlling factor in discharging the content from container 13 when it is desired to utilize the fuel of this container within the main tank, this control being provided by using a finger to open or close this opening $13^e$ when the container has been removed from the main tank and opening $13^d$ then held over the filling opening 11: at such time, opening $13^e$, if closed, will tend to prevent discharge of the content through opening $13^d$, while, if open, it will permit such fuel content to discharge and thus permit placing of the reserve charge within the main tank.

Cap 12 may be formed in various ways, a preferred way being shown in the drawings in which it is shown as provided with a depressed portion 12ª within which are located a pair of wing-like members 12ᵇ capable of being used as aids in the threading movement of the cap, these permitting threading and unthreading by the use of fingers alone; wings 12ᵇ may be secured to inwardly projecting portions 12ᶜ, as shown in the drawings. And, if desired, the cap may carry venting opening or openings 12ᵈ—this is a preferred arrangement.

Container 13 and cap 12 may be secured together in any desired manner so that the container will not interfere with the threading and unthreading of the cap and can be readily withdrawn through the main filling opening at will. In Figs. 1 and 2, I have shown these two parts as connected together by a screw or bolt 14, this being located axially of both members, and an arrangement by which the container is brought into proximity to the cap; in this form, it becomes necessary to bodily remove both cap and container in order to permit filling. With this form, I prefer to locate the filling opening in a longitudinal wall of the fuel tank because of lack of splashing space.

Another way in which these two can be connected is shown in Fig. 3, wherein a U-shaped member 15 serves to connect the two parts in such manner as to space them a distance equal to the distance between the two legs 15ª of the member, this distance being preferably greater than the depth of the main filling opening. The legs 15ª may be secured to the two members in any desired manner. In use, unthreading the cap serves to rotate the container 13 as well, thus raising the parts to a point where the cap can be freely moved. When this point is reached, it is possible to simply shift the combined structure laterally of the main filling opening, as indicated in dotted lines in Fig. 3, thus placing two members in a position where the main filling opening is not obstructed sufficiently to permit the filling action for the main tank to take place, and yet not requiring the actual removal of the reserve tank from the main tank, this being an advantage in that it does not become necessary to otherwise support this removable unit during the time taken for the main filling operation.

In the form shown in Fig. 3, the reserve tank filling opening can be located in the longitudinal or end wall of the reserve tank, the use of member 15 locating the upper end of tank 13 spaced from the main tank sufficiently to permit ready access of splashed fuel to the top of tank 13, such fuel entering this tank through opening 13ᶜ. And if the cap and tank 13 be properly spaced by the screw arrangement of Fig. 2, a similar result may be obtained.

It will be understood, of course, that the opening 13ᶜ and baffle 18 may be used in the specific arrangement of Fig. 2, the top of the latter then being as in Fig. 4. For the purpose of distinguishing as to reference characters, the parts in Figs. 3 and 4 of general similarity to those of Figs. 1 and 2, are indicated as 11′, 12′, 12ᵃ′, 12ᵇ′, 12ᶜ′, 13′, 13ᵇ′, 13ᵈ′, 13ᵉ′ and 13ᶠ′; there may be structural differences between these as to detail, but the general arrangement in the combination is similar in connection with these particular parts in the several views.

As will be understood, the arrangement of Fig. 3 tends to locate the top of the reserve tank or container farther from the top of the main tank than in Fig. 1, so that the top of the reserve tank is closer to the level of the content of the filled main tank, as well as located where the contents of the splashing gasoline of the main tank may fall upon the top of the reserve tank; advantage of this is taken in one of the forms contemplated, to use this splash to fill the reserve tank. However, it is preferred to utilize the openings 13ᵈ′ and 13ᵉ′, the opening 13ᶜ′ serving to drain the top 13ᵇ′ of any splashing content, it being understood that the reserve tank does not fill beyond opening 13ᵈ′, since any additional gasoline that may enter would drain out through this opening, although the splash content through opening 13ᶜ can serve to replenish the content of the reserve tank, should splashing in the latter cause some of the fuel to pass out through opening 13ᵈ′, thus permitting opening 13ᶜ to be of service in this respect to maintain the volume of the reserve tank especially when the fuel in the main tank presents a low level and thus less likely to splash to opening 13ᵈ′, although—due to the form of the walls of the main tank—causing splash on to the top of the reserve tank.

As will be readily understood, I have provided a construction which is capable of use with practically all the commercial forms of supply tanks, a construction which is simple and efficient in operation, durable in construction, and which can be manufactured at a comparatively low cost.

No claim is made herein to the specific arrangement in which the filling opening for the reserve tank is contained in top 13ᵇ alone—as by the use of opening 13ᶜ for instance—such construction forming the subject-matter of a divisional application filed by me Dec. 2, 1923, Serial No. 652,555.

While I have herein shown various ways in which the invention may be carried into effect, it will be readily understood that changes and modifications therein may be found desirable or essential in meeting the exigencies of use, and I desire to be understood as reserving the right to make any and all of such changes or modifications as may be found desirable or necessary in so far as the same may fall within the spirit or scope of the invention as expressed in the accompanying claims.

What I claim is:—

1. A fuel reserve instrumentality for motor vehicle service and comprising a closure member for the filling opening of the fuel supply tank, and a fuel container secured to and depending from and movable with the closure, said container preventing filling of the supply tank when in normal position and having dimensions and a configuration to permit free passage through the filling opening, said container having a permanently closed bottom and having an opening in a longitudinally-extending wall thereof intermediate the opposite ends of the container, the position of the opening being such as to approximately control the amount of the reserve charge, said opening forming the discharge port for the reserve charge.

2. A fuel reserve instrumentality for motor vehicle service and comprising a closure member for the filling opening of the fuel supply tank, and a fuel container secured to and depending from and movable with the closure, said container preventing filling of the supply tank when in normal position and having dimensions and a configuration to permit free passage through the filling opening, said container having a permanently closed bottom and having an opening in a longitudinally extending wall thereof intermediate the opposite ends of the container, the position of the opening being such as to approximately control the amount of the reserve charge, said opening forming the discharge port for the reserve charge, said container also having a vent opening positioned between the plane of the discharge opening and the container top.

3. A fuel reserve instrumentality for motor vehicle service and comprising a closure member for the filling opening of the fuel supply tank, and a fuel container secured to and depending from and movable with the closure, said container preventing filling of the supply tank when in normal position and having dimensions and a configuration to permit free passage through the filling opening, said container having a permanently closed bottom and having an opening in a longitudinally extending wall thereof intermediate the opposite ends of the container, said opening serving to provide open communication between the tank and container interior when the container is within the supply tank, the position of the opening being such as to approximately control the amount of the reserve charge, said opening forming the discharge port for the reserve charge.

4. The combination with a fuel supply tank having a filling opening, of a combined closure and fuel reserve instrumentality having a construction to permit location of the fuel reserve container within the tank and the closure secured in the filling opening, said instrumentality being movable as a unit and having a portion operative to bridge the opening wall to permit lateral shifting of the instrumentality to expose the opening when the container is in the tank.

5. The combination with a fuel supply tank having a filling opening, of a combined closure and fuel reserve instrumentality having a construction to permit location of the fuel reserve container within the tank and the closure secured in the filling opening, said instrumentality being movable as a unit and having a portion operative to bridge the opening wall to permit lateral shifting of the instrumentality to expose the opening when the container is in the tank, the bridging portion in its shifted position extending in overlying relation to a tank wall to provide a support for the container.

6. The combination with a fuel supply tank having a filling opening, of a combined closure and fuel reserve unit operative to close the filling opening and locate a reserve fuel charge within the tank, said unit comprising a closure member, a container for the charge, and a U-shaped member connecting the closure and container in approximate axial alinement, said container having dimensions to permit its free passage through the filling opening.

7. The combination with a fuel supply tank having a filling opening, of a combined closure and fuel reserve unit operative to close the filling opening and locate a reserve fuel charge within the tank, said unit comprising a closure member, a container for the charge, and a U-shape member connecting the closure and container in approximate axial alinement, said container having dimensions to permit its free passage through the filling opening, the connection of U-shape member and the closure and container being such as to provide an open space therebetween of dimensions such as to permit the legs of the member to straddle the filling opening wall when the unit is shifted laterally in presence of container location within the tank.

8. An instrumentality as in claim 1, characterized in that the end of the container adjacent the closure is provided with a venting opening and with a baffle for such opening.

9. A fuel reserve instrumentality for motor vehicle service and comprising a closure member for the filling opening of the fuel supply tank, and a fuel container secured to and depending from and movable with the closure, said container preventing filling of the supply tank when in normal position and having dimensions and a configuration to permit free passage through the filling opening, said container having a permanently closed bottom and being provided with a filling port, said port being positioned to receive fuel from the main tank during periods of fuel splashing activity within the main tank.

10. A fuel reserve instrumentality for motor vehicle service and comprising a closure member for the filling opening of the fuel supply tank, and a fuel container secured to and depending from and movable with the closure, said container preventing filling of the supply tank when in normal position and having dimensions and a configuration to permit free passage through the filling opening, said container having a permanently closed bottom and being provided with a filling port, said port being positioned at a point above the general fuel level of the main tank and accessible to the fuel within the tank by splashing activity.

In testimony whereof I affix my signature in presence of two witnesses.

JOHN G. ARMKNECHT.

Witnesses:
 HORACE G. SEITZ,
 ANNA M. DORR.